March 25, 1958  W. H. GENICH  2,827,862
AUTOMATIC CANDY CANE CROOKER
Filed June 11, 1956  2 Sheets-Sheet 1

INVENTOR.
WILLIAM H. GENICH
BY
*Philip S. McDean*
ATTORNEY

March 25, 1958  W. H. GENICH  2,827,862
AUTOMATIC CANDY CANE CROOKER
Filed June 11, 1956  2 Sheets-Sheet 2
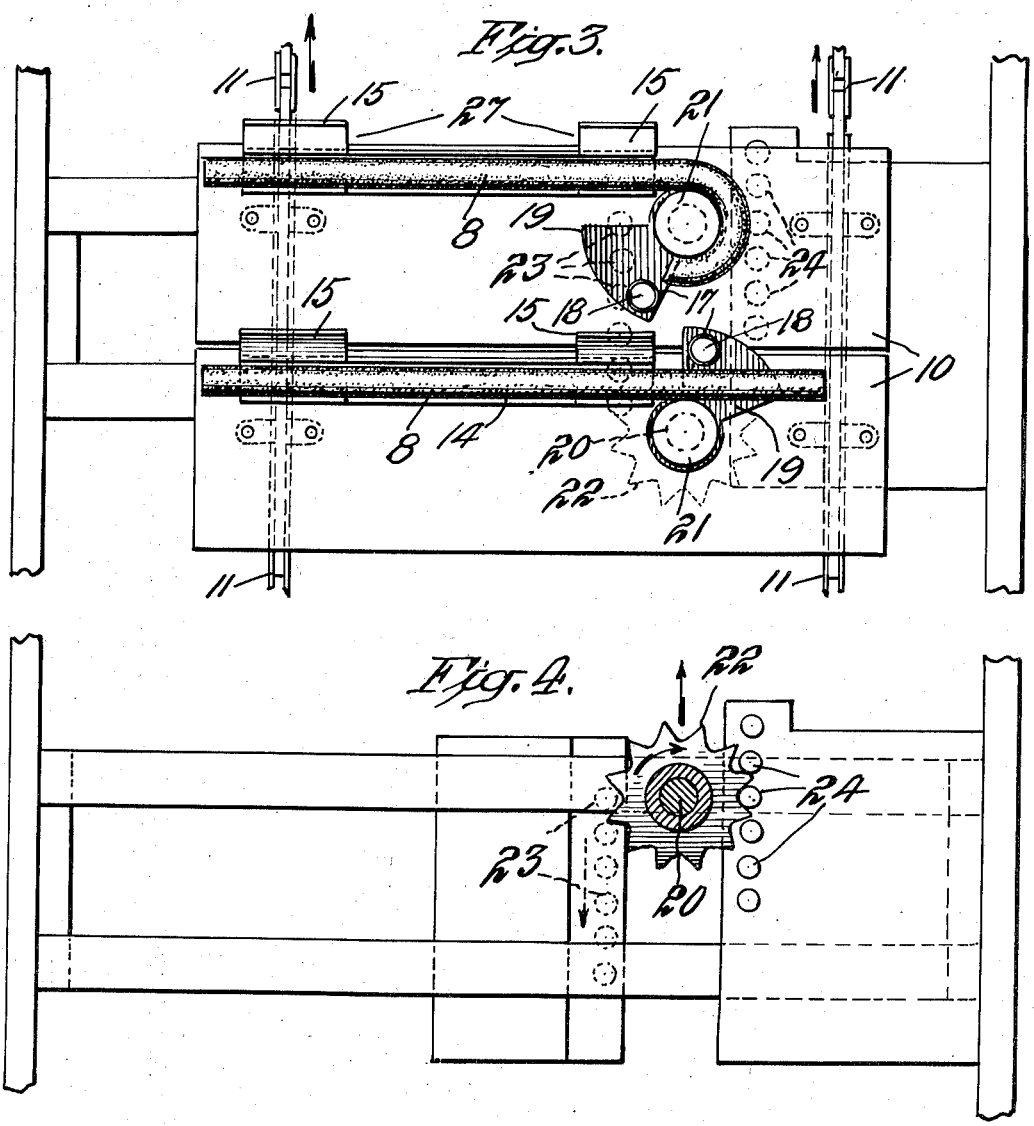
INVENTOR.
WILLIAM H. GENICH
BY
ATTORNEY United States Patent Office 2,827,862
Patented Mar. 25, 1958

2,827,862

AUTOMATIC CANDY CANE CROOKER

William H. Genich, Racine, Wis., assignor to Racine Confectioners' Machinery Co., Racine, Wis., a corporation of Wisconsin Application June 11, 1956, Serial No. 590,595

7 Claims. (Cl. 107—8)

The invention here disclosed relates to the manufacture of candy canes.

Objects of the invention have been to provide simple, practical and effective means for bending the crooks in the ends of the candy sticks and to provide this mechanism in a form readily combinable with existing candy stick machinery.

Further special objects of the invention are to provide candy stick crook forming mechanism, which will operate rapidly and continuously, without slowing down production of the candy sticks.

Other desirable objects and the novel features through which the purposes of the invention are attained are set forth and will appear in the course of the following specification.

The drawings accompanying and forming part of the specification illustrate a present commercial embodiment of the invention, but structure may be modified and changed as regards immediate illustration, without departure from the true spirit and scope of the invention as hereinafter defined and claimed.

Fig. 1 in the drawings is a broken and vertical sectional view of the candy stick conveying and bending conveyor, arranged to receive candy sticks from the rolling conveyor and to deposit the completed articles on a take-off conveyor, this view taken substantially on the plane of line 1—1 of Fig. 2.

Fig. 3 is an enlarged broken plan view on substantially the plane of line 3—3 of Fig. 1, illustrating progressive stages in the travel and crooking of the candy sticks.

Fig. 4 is a horizontal sectional view as on substantially the plane of line 4—4 of Fig. 2, illustrating engagement of one of the bender sprockets with the upper set of turning pins.

Figure 1:
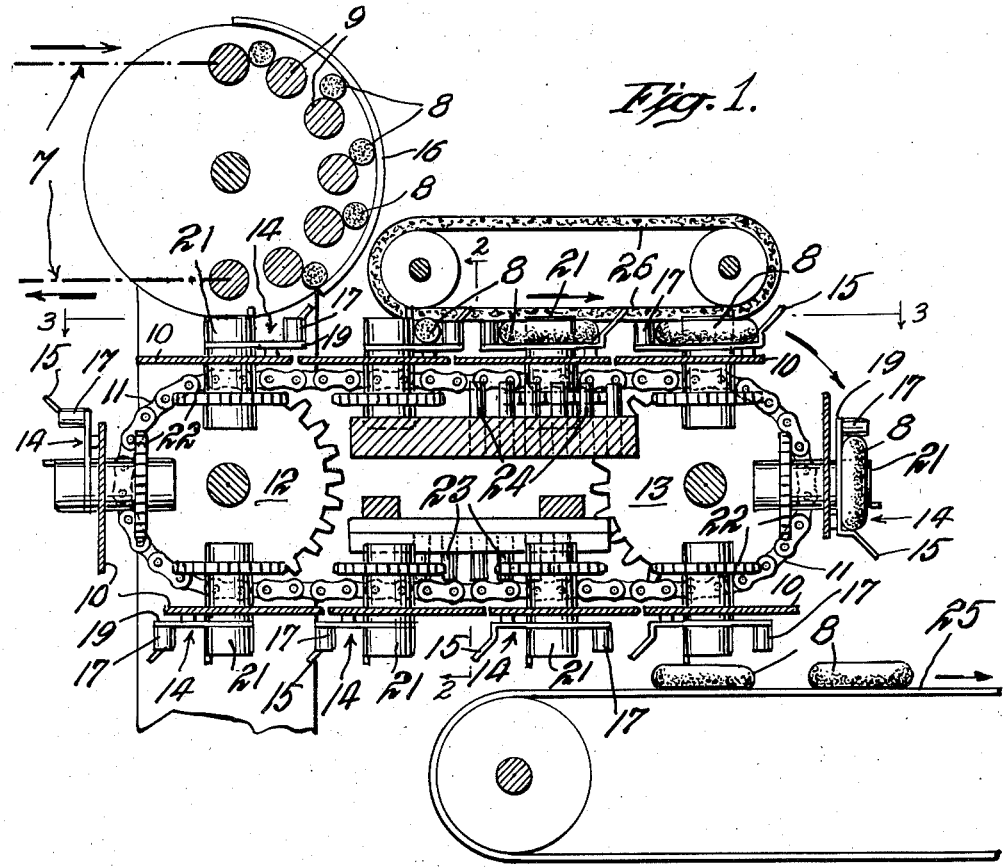

In Fig. 1, the end of a rolling conveyor is indicated at 7, carrying the sticks or ropes 8, of candy.

This rolling conveyor is usually made up of a series of rollers 9, travelling over sprockets and revolving to keep the warm pliable candy sticks straight and round and in separated relation.

Further, this stick rolling conveyor may be directly associated with a twisting and cutting machine, taking the sticks as they are cut off and carrying them direct to the cane crooking section.

The cane crooking unit is shown as made up of a series of transverse plates or slats 10, carried by chains 11, riding on sprockets 12, 13, and carrying transverse channels or troughs 14, for the sticks of candy.

These trough-like holding members are shown as having upwardly and outwardly inclined sides 15, cooperative with the surrounding arcuate guide 16, at the end of the rolling conveyor, to guide the sticks smoothly into the channels.

Each of the cross slats or plates 10, carries a rotative bender 17, at one end of the stick holding channel thereon, this bender being shown as a roll journalled on a stud 18, on a segmental plate 19, fixed on the upper end of a rock shaft 20, Fig. 3.

The rotative segment 19, carrying the bender roll is shown in Fig. 3, as disposed at the end of and in line with the bottom of the stick supporting channel and with the bending roll separated from the outer roll circumference 21, of the shaft 20, by a distance equal to or slightly greater than the width of the channel, so that as shown in the lower portion of Fig. 3, the candy stick may freely drop into the channel and between the hub 21, and bending roll 17, with the projecting portion of the stick resting on the segmental plate portion 19 of the bender.

In the operation of the machine, the segments carrying the bending rolls are oscillated first one way and then in the opposite direction, so as to be in line with the ends of the channels when they pass beneath the end of the rolling conveyor, Fig. 1, and so as to bend or crook the ends of the sticks about the hubs 21, as they travel on away from the end of the roller conveyor.

Figure 2:
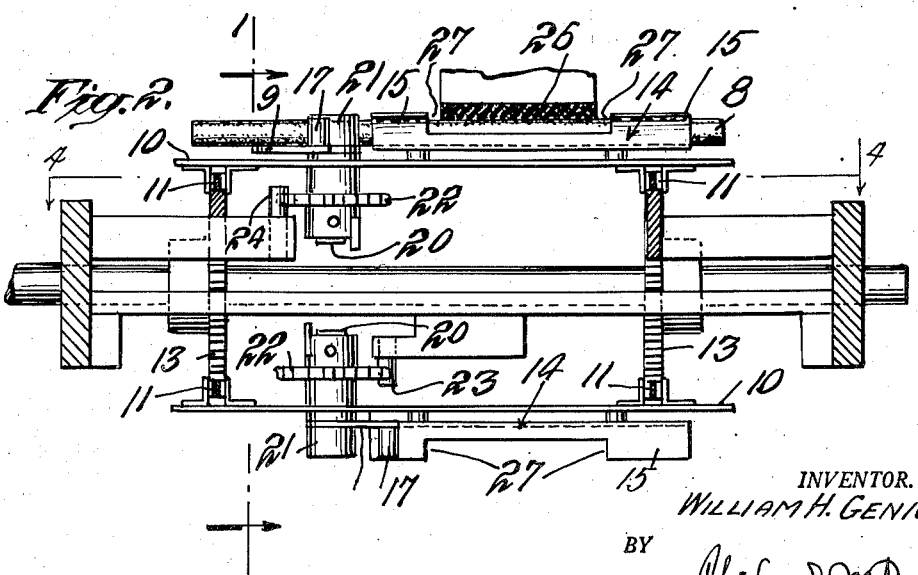
Fig. 2 is a broken transverse vertical sectional view as on substantially the plane of line 2—2 of Fig. 1.

The means for effecting these lining up and stick bending movements of the benders comprise in the illustration sprockets 22, on the lower or inner ends of shafts 20, cooperative with a lower row of turning pins 23, at one side of the path of sprocket travel Fig. 2, and an upper row of turning pins 24, at the opposite side of the sprocket path of movement.

In Fig. 3, the lower stick holder, the one nearest to the supply conveyor, with the bender in line with the transverse channel or holding pocket is indicated as having received a candy stick 8. In this position, the sprocket 22, on the lower end of the bender shaft 20, is about to engage the turning pins 24, of the upper row.

Fig. 4 shows the sprocket, in the further forward travel of the conveyor, as in engagement with upper turning pins 24, and as being rotated right-handedly in the direction of the arrow to rotate the bending roll 17, as shown at the top in Fig. 3, to curl the projecting end of the stick about the center hub 21.

As the chains 11, carrying the benders travel about the outer sprockets 13, as shown at the right in Fig. 1, the completed candy canes are dropped on to a take-off or removal conveyor 25.

During travel in the opposite direction, that is, toward the supply source, the lower run of the conveyor carries the bender sprockets into engagement with the lower row of turning pins 23, at the opposite side of the sprocket path of travel and this effects turning of the benders in the reverse direction, back to the position shown at the left hand end of Fig. 1, with the bender rolls lined up with the sides of the pockets ready to receive the straight lengths of candy.

In action the bender rolls have a tendency to drag the candy stick lengthwise of the holder channels. To overcome this creeping effect, the sticks are positively held down in the channels during the crooking operation, in the illustration, by an overrunning belt 26, of sponge rubber or the like, bearing down lightly on the sticks.

To permit this action, the channels are shown cut down in their intermediate portions at 27, to enable the lower run of the belt to engage the sticks.

The crooking mechanism, that is the conveyor with the benders may be made up in a unit construction attachable as such to the end of the rolling conveyor frame. Thus units designed for different size candy canes may be used at different times with the same supply conveyor. These crooking units may be designed to run at the same speed as the twisting and cutting machine and the stick rolling conveyor, so as not to slow down the production of such machines.

The crooking unit is of simple sturdy construction, easily cleaned and kept in running order. The pins for turning the bender sprockets constitute in effect, a rack and the length or extent of such racks may be varied by using different numbers of pins. The bending rolls and the hubs about which the candy sticks are bent may be of material, or faced with material, such as nylon, to which the candy will not adhere.

What is claimed is:

1. Automatic candy cane crooker, comprising the combination of an endless belt conveyor, transversely extended stick candy receiving pockets carried by said conveyor, circular hubs at the ends of and tangential to sides of said pockets, crook bending rolls at opposite sides of said pockets, means for rotating said bending rolls, circularly about the centers of said hubs in the travel of said endless conveyor, including segmental levers journalled on said hub centers at the ends of said pockets and carrying said bending rolls, shafts carrying said segmental levers at one end, sprockets on the opposite ends of said shafts and stationary rack elements engageable by said sprockets in the travel of said conveyor.

2. Automatic candy cane crooker, comprising the combination of an endless belt conveyor, transversely extended stick candy receiving pockets carried by said conveyor, circular hubs at the ends of and tangential to sides of said pockets, crook bending rolls at opposite sides of said pockets, means for rotating said bending rolls circularly about the centers of said hubs in the travel of said endless conveyor, including segmental levers journalled on said hub centers at the ends of said pockets and carrying said bending rolls, shafts carrying said segmental levers at one end, sprockets on the opposite ends of said shafts, stationary rack elements engageable by said sprockets in the travel of said conveyor, with one rack element located at a higher level and disposed to one side of the path of travel of said sprockets and another rack element located at a lower level and at the opposite side of the path of travel of said sprockets.

3. Automatic candy cane crooker comprising the combination of horizontally disposed endless conveyor chains traveling in parallel relation, cross slats carried by said chains, candy stick holders on said slats, upright shafts journalled on said slats at the ends of said holders, candy stick benders on the upper ends of said shafts normally positioned to one side of said holders, sprockets on the lower ends of said shafts and rack members engageable by said sprockets in the travel of said conveyor chains and positioned to turn said sprockets in one direction for effecting candy stick bending movement of said benders and for then restoring said benders to said normal position at one side of said candy stick holders.

4. The invention according to claim 3, in which said benders have candy stick supporting plates in line with the bottom portion of said holders whereby to support projecting portions of the candy sticks while the same are being bent by said benders.

5. The invention according to claim 3, with a hold down belt operating over the upper run of the conveyor chain in position for riding engagement with candy sticks supported in the holders.

6. The invention according to claim 3, in which said holders are in the form of open top channels cut down at the sides to expose upper portions of candy sticks supported therein and in which a hold down belt is mounted over the conveyor chains in line with said cut down sides of said channels for confining candy sticks in the channels during the crook bending operation.

7. Automatic candy cane crooker comprising the combination of an endless conveyor, transversely extended candy stick receiving pockets on said conveyor, crook benders journalled on said conveyor at the ends of said pockets in position to engage protruding portions of candy sticks located in said pockets, sprockets connected with said benders and stationary racks mounted in position to be engaged by said sprockets in the travel of said conveyor and disposed to opposite sides of the bender line of travel for turning said benders first in one direction and then in the opposite direction.

References Cited in the file of this patent

UNITED STATES PATENTS

| | | |
|---|---|---|
| 1,762,327 | Coffey | June 30, 1930 |
| 1,836,349 | Westerfield | Dec. 15, 1931 |